United States Patent
Zhao et al.

(10) Patent No.: US 9,686,657 B1
(45) Date of Patent: Jun. 20, 2017

(54) METHODS AND SYSTEMS FOR SIMULTANEOUS TALKING IN A TALKGROUP USING A DYNAMIC CHANNEL CHAIN

(71) Applicant: MOTOROLA SOLUTIONS, INC, Chicago, IL (US)

(72) Inventors: Kang-Kai Zhao, Chengdu (CN); Da-Jun Chen, Chengdu (CN); Yong Li, Chengdu (CN); Yong Tian, Chengdu (CN); Wu Yang, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/320,000

(22) PCT Filed: Jul. 10, 2014

(86) PCT No.: PCT/CN2014/081984
§ 371 (c)(1),
(2) Date: Dec. 19, 2016

(87) PCT Pub. No.: WO2016/004600
PCT Pub. Date: Jan. 14, 2016

(51) Int. Cl.
*H04W 76/00* (2009.01)
*H04W 4/10* (2009.01)
(Continued)

(52) U.S. Cl.
CPC ......... *H04W 4/10* (2013.01); *H04W 74/0808* (2013.01); *H04W 84/08* (2013.01)

(58) Field of Classification Search
CPC ... H04W 36/0016; H04W 36/06; H04W 4/10; H04W 76/005
(Continued)

(56) References Cited

U.S. PATENT DOCUMENTS 5,287,549 A * 2/1994 Roehrs ............... H04B 1/10
455/218
5,612,955 A * 3/1997 Fernandes ............ H04B 17/382
370/433

(Continued)

FOREIGN PATENT DOCUMENTS

| CN | 1968456 | 9/2010 |
| WO | 2010039632 A2 | 4/2010 |

OTHER PUBLICATIONS

The International Search Report and the Written Opinion, For corresponding application—PCT/CN2014/081984, filed: Jul. 10, 2014, all pages.

*Primary Examiner* — Tan H Trinh

(57) ABSTRACT

A mobile radio has selectable transmit and receive channels, and is in a talkgroup that has a primary channel and multiple auxiliary channels. The mobile radio receives a broadcast-start command, and responsively selects its transmit channel to be the primary channel (if available) or an inactive auxiliary channel (if the primary channel is not available). The mobile radio receives user media via its user interface, and transmits that received user media on its selected transmit channel. The mobile radio scans for an auxiliary channel transitioning from inactive to active. Responsive to detecting such a transition, the mobile radio selects that auxiliary channel as its receive channel. The mobile radio mixes inbound media received on its selected receive channel with user media received via its user interface, and transmits the mixed media on its selected transmit channel.

20 Claims, 11 Drawing Sheets

(51) Int. Cl.
*H04W 74/08* (2009.01)
*H04W 84/08* (2009.01)

(58) Field of Classification Search
USPC ...... 455/518, 519, 90.2, 509, 502, 503, 525,
455/426.1, 452.2, 520, 425, 566, 67.11,
455/67.13, 62, 512, 517; 370/327, 433,
370/277, 312, 252, 328; 375/340;
704/235; 709/204, 227
See application file for complete search history.

(56) References Cited

U.S. PATENT DOCUMENTS

| | | | |
|---|---|---|---|
| 7,026,957 B2* | 4/2006 | Rubenstein | B60R 16/0373 340/692 |
| 7,062,286 B2 | 6/2006 | Grivas et al. | |
| 7,558,590 B2 | 7/2009 | Baudino et al. | |
| 8,320,948 B2 | 11/2012 | Li et al. | |
| 8,358,968 B2* | 1/2013 | Panpaliya | H04W 16/26 370/315 |
| 8,432,834 B2 | 4/2013 | Shaffer et al. | |
| 8,442,431 B2 | 5/2013 | Chen et al. | |
| 8,442,506 B2 | 5/2013 | Peacock et al. | |
| 8,989,791 B1* | 3/2015 | Puliatti | H04W 4/10 455/519 |
| 9,232,365 B1* | 1/2016 | Mansour | H04W 4/10 |
| 9,585,121 B2* | 2/2017 | Gustafson | H04W 72/005 |
| 2004/0120474 A1* | 6/2004 | Lopponen | H04M 3/42 379/88.17 |
| 2006/0030344 A1* | 2/2006 | Lim | H04W 4/10 455/512 |
| 2006/0154682 A1* | 7/2006 | Shim | H04W 4/08 455/518 |
| 2007/0049314 A1* | 3/2007 | Balachandran | H04W 4/10 455/518 |
| 2007/0155346 A1 | 7/2007 | Mijatovic et al. | |
| 2008/0043678 A1 | 2/2008 | Taniguchi | |
| 2008/0285487 A1 | 11/2008 | Forslow et al. | |
| 2009/0252084 A1* | 10/2009 | Fodor | H04L 12/189 370/328 |
| 2009/0276214 A1* | 11/2009 | Chong | H04W 4/10 704/235 |
| 2010/0011122 A1* | 1/2010 | Rosen | H04W 4/10 709/239 |
| 2010/0097952 A1* | 4/2010 | McHenry | H04L 27/0006 370/252 |
| 2010/0105332 A1* | 4/2010 | McHenry | H04W 16/14 455/62 |
| 2010/0173586 A1* | 7/2010 | McHenry | H04L 27/0006 455/62 |
| 2010/0216500 A1* | 8/2010 | Shatsky | H04M 7/121 455/518 |
| 2010/0248769 A1 | 9/2010 | Li et al. | |
| 2011/0225238 A1* | 9/2011 | Shaffer | H04L 63/08 709/204 |
| 2012/0069937 A1* | 3/2012 | Stein | H04L 25/024 375/340 |
| 2014/0050203 A1 | 2/2014 | Doppler et al. | |
| 2014/0066118 A1* | 3/2014 | Pai | H04W 4/10 455/518 |
| 2014/0233447 A1* | 8/2014 | Ofir | H04W 4/10 370/312 |
| 2015/0065186 A1* | 3/2015 | Mohd Mohdi | H04W 4/10 455/518 |
| 2015/0094109 A1* | 4/2015 | Yang | H04W 72/02 455/509 |
| 2016/0227384 A1* | 8/2016 | Mazzarella | H04W 4/08 |
| 2016/0269877 A1* | 9/2016 | Tang | H04W 4/10 |

* cited by examiner

METHODS AND SYSTEMS FOR SIMULTANEOUS TALKING IN A TALKGROUP USING A DYNAMIC CHANNEL CHAIN

BACKGROUND OF THE INVENTION

"This application is a National Stage filing under 35 USC §371 of Patent Cooperation Treaty international application having Serial No. PCT/CN14/081984 (the 'PCT international application') filed on Jul. 10, 2014. This application claims priority to the PCT international application, the entire contents of which are incorporated herein by reference."

It is important for public-safety responders to be able to communicate with each other on a regular basis. As a result, one of the most commonly used tools in the public-safety context is a mobile radio. Some mobile radios communicate via cellular radio networks, some communicate via ad-hoc device-to-device connections (as part of, e.g., an ad-hoc network of such connections); such communication is referred to interchangeably in this disclosure at various times using adjectives such as direct, direct-mode, localized, point-to-point, peer-to-peer, and the like. Some mobile radios are equipped, programmed, and configured to be able to communicate via both cellular networks and ad-hoc arrangements, perhaps in addition to being able to communicate according to one or more other configurations. Mobile radios may be incorporated into or with one or more other devices such as cell phones, smartphones, tablets, notebook computers, laptop computers, and the like. Moreover, some mobile radios are referred to at times using terms such as handheld, handheld transceiver, walkie-talkie, two-way radio, and the like. As one example, some devices include the functionality of both a smartphone and a mobile radio. And certainly many other examples could be listed, as known to those having skill in the relevant art.

Public-safety personnel utilize mobile radios in talkgroups so that multiple responders can simultaneously hear what one person is saying, and so that talkgroup members can respond in an easy and effective fashion. This is far more efficient than a responder serially sending out the same message to a plurality of allies. It is desirable for a public-safety responder to be able to communicate with as many allies as possible as efficiently as possible for at least the reason that the immediacy and efficacy with which public-safety responders can communicate with one another are quite often determinative with respect to how positive the ultimate outcome of a given incident can be. Accordingly, there is a need for methods and systems for simultaneous talking in a talkgroup using a dynamic channel chain.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
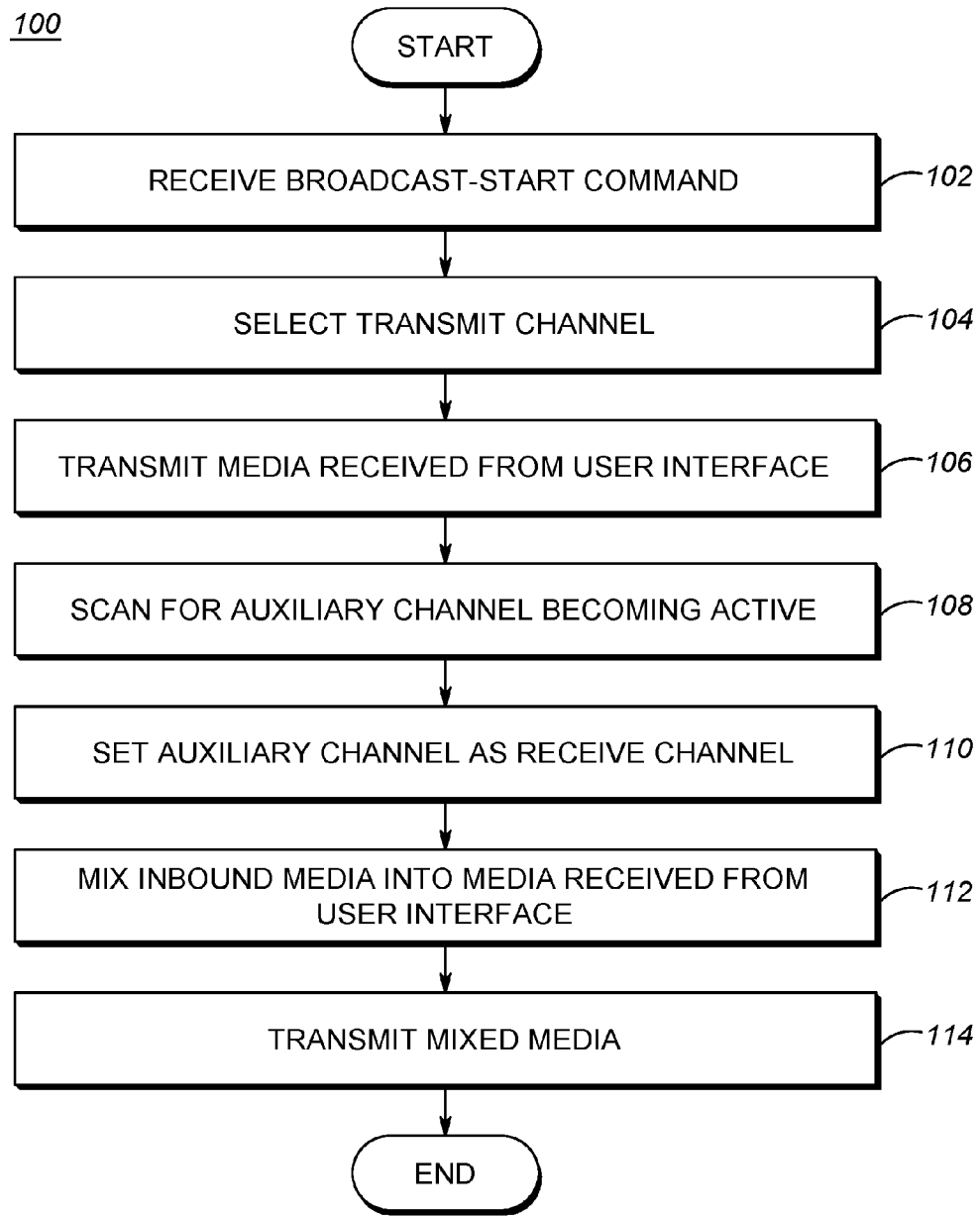
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for simultaneous talking in a talkgroup using a dynamic channel chain. One embodiment takes the form of a process that includes a mobile radio receiving via a user interface a broadcast-start command associated with a talkgroup in which the mobile radio is a participant, the talkgroup having an associated channel set that includes a primary channel and a group of auxiliary channels, the mobile radio having a selectable transmit channel and a selectable receive channel. The process also includes the mobile radio, responsive to receiving the broadcast-start command, selecting the primary channel as its transmit channel if the primary channel is inactive, and otherwise selecting an inactive auxiliary channel as its transmit channel. The process also includes the mobile radio receiving user media via the user interface, and transmitting received user media on the selected transmit channel. The process also includes the mobile radio scanning for a transition of an auxiliary channel from inactive to active. The process also includes the mobile radio, responsive to detecting such a transition on a given auxiliary channel, selecting the given auxiliary channel as its receive channel for receiving inbound media, generating mixed media at least in part by mixing inbound media received on the selected receive channel with user media received via the user interface, and transmitting the mixed media on the selected transmit channel.

Another embodiment takes the form of a system that includes a mobile radio, where the mobile radio includes a user interface, a communication interface having a selectable transmit channel and a selectable receive channel, a processor, and data storage containing instructions executable by the processor for causing the mobile radio to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, the broadcast-start command corresponds to a push-to-talk (PTT) button being held down.

In at least one embodiment, the talkgroup is a PTT talkgroup.

In at least one embodiment, the primary channel is a predetermined one of the channels in the channel set.

In at least one embodiment, the mobile radio determines that no channels in the channel set are currently active, and responsively designates a given channel from the channel set as being the primary channel.

In at least one embodiment, the primary channel is the default receive channel for each non-transmitting mobile radio in the talkgroup.

In at least one embodiment, the mobile radio selecting an inactive auxiliary channel as its transmit channel includes the mobile radio selecting a test channel, the mobile radio verifying that the test channel is inactive, the mobile radio transmitting a broadcast-request message on the test channel, the mobile radio verifying that the test channel is not currently carrying one or more other broadcast-request messages, and the mobile radio selecting the test channel as its transmit channel.

In at least one embodiment, a predetermined sequence is defined among the primary channel and the respective auxiliary channels; and in at least one such embodiment, the mobile radio determines that its current receive channel is inactive, and responsively changes its selected receive channel to be the next active channel in the predetermined sequence.

In at least one embodiment, the mobile radio identifies a contingency receive channel; the mobile radio detects a termination event on its current receive channel, and responsively changes its selected receive channel to be the contingency receive channel. In at least one such embodiment, identifying the contingency receive channel includes receiving a termination notice on the selected receive channel, where the termination notice identifies the contingency receive channel, and detecting the termination event includes receiving the termination notice. In at least one other such embodiment, identifying the contingency receive channel includes, prior to detecting the termination event, receiving a message on the selected receive channel, where the message identifies the contingency receive channel; in at least one such embodiment, detecting the termination event involves receiving a termination notice on the selected receive channel; in at least one other such embodiment, detecting the termination event involves detecting that the selected receive channel is inactive.

In at least one embodiment, the mobile radio transmits outbound metadata on the selected transmit channel, where the outbound metadata identifies the selected receive channel.

In at least one embodiment, the mobile radio receives a termination notice identifying a terminating transmit channel and a terminating receive channel, and responsively changes its selected transmit channel to be the identified terminating transmit channel when its current transmit channel matches the identified terminating receive channel, and changes its selected receive channel to be the identified terminating receive channel when its current receive channel matches the identified terminating transmit channel.

In at least one embodiment, the mobile radio receives via the user interface a broadcast-stop command, and responsively terminates transmitting on the selected transmit channel and selects the primary channel as its receive channel; in at least one such embodiment, the broadcast-stop command corresponds to a PTT button being released; in at least one other such embodiment, the mobile radio also transmits a termination notice on the selected transmit channel.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example process, in accordance with an embodiment. In particular, FIG. 1 depicts a process 100 that in at least one embodiment is carried out by a mobile radio. The description of the process 100 as being carried out by a mobile radio is provided by way of example, as other suitably equipped and programmed devices could carry out the process 100, as known to those in the art.

At step 102, a mobile radio receives via a user interface a broadcast-start command associated with a talkgroup in which the mobile radio is a participant. The mobile radio has a selectable transmit channel and a selectable receive channel, and these two channels can and often do operate simultaneously such that the mobile radio is transmitting on one channel and receiving on a different channel at the same or at least at substantially the same time; thus, the mobile radio may have a both a tunable transmitter (or first transceiver) to provide the selectable transmit channel and a tunable receiver (or second transceiver) to provide the selectable receive channel; and certainly many other example architectures could be listed, as known to those of skill in the art. Moreover, the talkgroup is associated with a channel set that includes a primary channel and a group of auxiliary channels. The channel set may be defined by a channel-set listing of channels, stored in a code plug or other non-volatile storage in the mobile radio, and which may include mappings between talkgroups and primary and/or auxiliary channels and may further include a channel-selection ordering for each talkgroup, among other possibilities.

Continuing on with the description of the example process 100, at step 104, the mobile radio, responsive to receiving the broadcast-start command, selects the primary channel as its transmit channel if the primary channel is inactive, and otherwise selects an inactive auxiliary channel as its transmit channel. At step 106, the mobile radio receives user media (e.g., voice data) via the user interface, and transmits the received user media on the selected transmit channel. At step 108, the mobile radio scans for a transition of an auxiliary channel from inactive to active. At step 110, the mobile radio, responsive to detecting such a transition on a given auxiliary channel, selects the given auxiliary channel as its receive channel for receiving inbound media (e.g., voice data from another mobile radio). At step 112, the mobile radio generates mixed media at least in part by mixing inbound media received on the selected receive channel with user media received via the user interface. At step 114, the mobile radio transmits the mixed media on the selected transmit channel. Each of these steps is discussed more fully below in connection with one or more of the ensuing figures.

Figure 2:
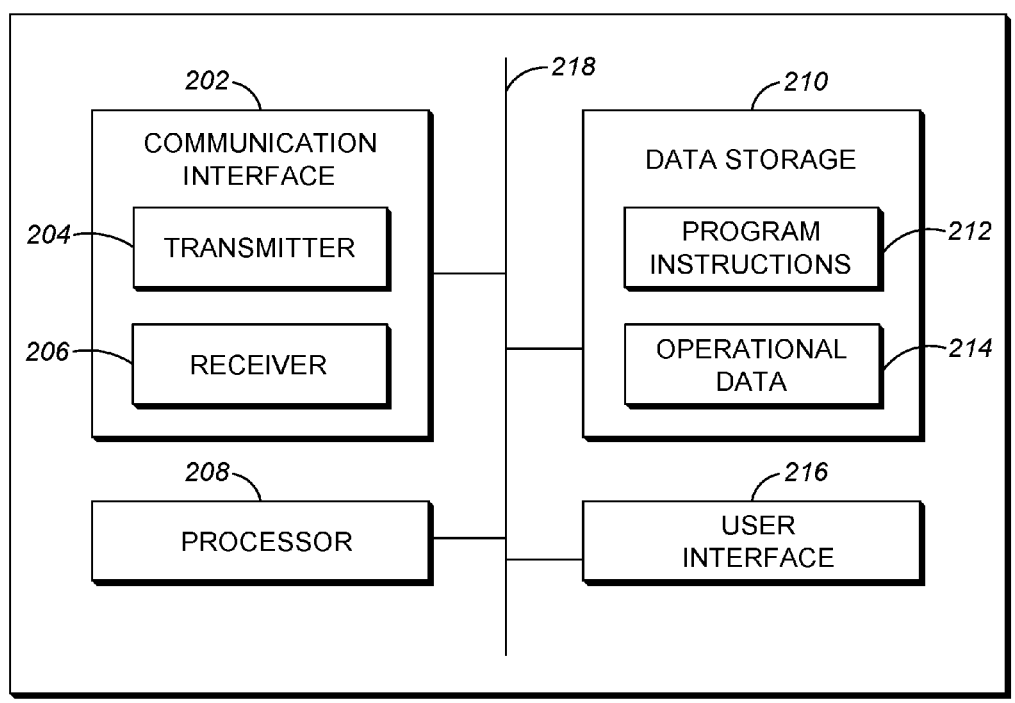
FIG. 2 depicts an example mobile radio, in accordance with an embodiment.

FIG. 2 depicts an example mobile radio, in accordance with an embodiment. In particular, FIG. 2 depicts an example mobile radio 200 as including a communication interface 202, a processor 208, a data storage 210, and a user interface 216, all of which are communicatively coupled with one another via a system bus 218 (or other suitable communication connection, network, or the like).

In the depicted example, the communication interface 202 includes a transmitter 204 and a receiver 206. The transmitter 204 can be configured to transmit on one of a set of channels. The receiver 206 can be configured to receive on one of a set of channels, which typically would not be the channel used by the transmitter. The communication interface 202 may include two or more wireless-communication interfaces (for communicating according to, e.g., RF, LTE, APCO P25, ETSI DMR, TETRA, WiFi, Bluetooth, and/or one or more other protocols), and may also include one or more wired-communication interfaces (for communicating according to, e.g., Ethernet, USB, and/or one or more other protocols). As such, the communication interface 202 may include any necessary hardware (e.g., chipsets, antennas, Ethernet cards, etc.), any necessary firmware, and any necessary software for conducting one or more forms of communication with one or more other entities as described herein. The processor 208 may include one or more processors of any type deemed suitable by those of skill in the relevant art, some examples including a general-purpose microprocessor and a dedicated digital signal processor (DSP).

The example mobile radio 200 may in some instances be part of a channel chain that also includes other similar devices. In such a channel chain, the example mobile radio 200 may transmit media (and/or other data) using the transmitter 204, and may receive media (and/or other data) using the receiver 206. Moreover, one or more other mobile radios that are similarly equipped, configured, and programmed may use their respective receivers 206 to receive transmissions from the mobile radio 200.

The data storage 210 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 210 contains program instructions 212 executable by the processor 208 for carrying out various functions described herein, and further is depicted as containing operational data 214, which may include any one or more data values stored by and/or accessed by the example mobile radio 200 in carrying out one or more of the functions described herein.

The user interface 216 may include one or more input devices (a.k.a. components and the like) and/or one or more output devices (a.k.a. components and the like). With respect to input devices, the user interface 216 may include one or more touchscreens, buttons, switches, microphones, and the like. With respect to output devices, the user interface 216 may include one or more displays, speakers, light emitting diodes (LEDs), and the like. Moreover, one or more components (e.g., an interactive touchscreen and display) of the user interface 216 could provide both user-input and user-output functionality. And certainly other user-interface components (e.g., a PTT button) could be implemented in a given context, as known to those of skill in the art.

Figure 3:
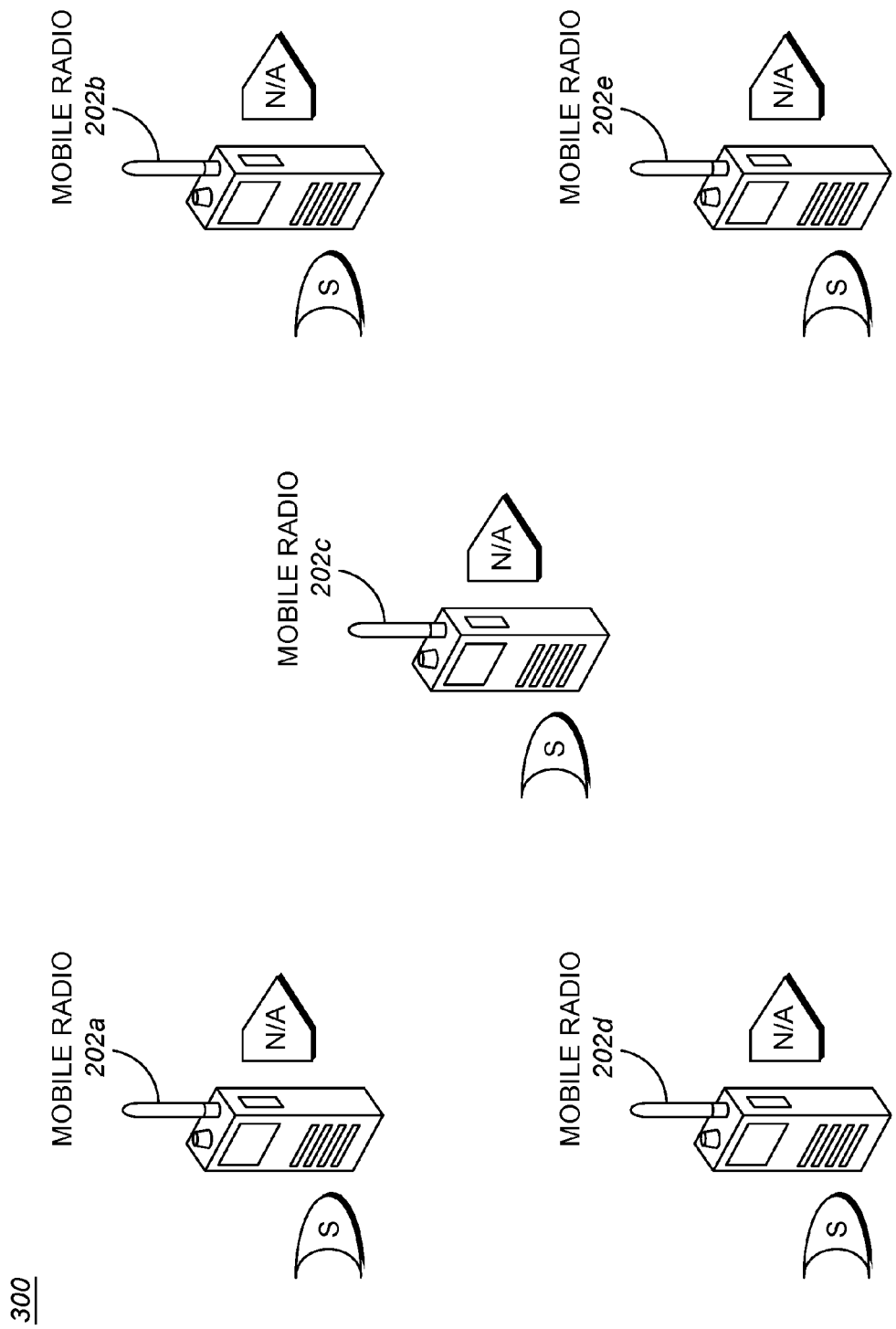
FIG. 3 depicts a first example scenario involving a plurality of mobile radios, in accordance with an embodiment.

FIG. 3 depicts a first example scenario involving a plurality of mobile radios, in accordance with an embodiment. FIG. 3 illustrates five mobile radios, the mobile radios 202a-e as being part of an established talkgroup that is associated with a predefined set of communication channels. In at least one embodiment, the talkgroup is a PTT talkgroup. In the depicted example, each mobile radio 202a-e has a respective transmitter with a selectable transmit channel and a respective receiver with a selectable receive channel.

In FIGS. 3-9, each mobile radio is depicted along with a transmit-channel indicator on its right side and a receive-channel indicator on its left side. Each transmit-channel indicator takes the form of a right-pointing arrow having therein a textual indication of the particular channel (abstractly represented using letters of the alphabet) on which the corresponding mobile radio is currently transmitting (or at least of the particular channel that is currently selected by that mobile radio as its transmit channel). A mobile radio that does not have a currently selected transmit channel is depicted with its transmit-channel indicator containing the text "N/A" (for "not applicable").

Each receive-channel indicator takes the form of a crescent having a concave side facing to the left; each receive-channel indicator has therein a similar textual indication of the particular channel on which the corresponding mobile radio is currently receiving (or at least of the particular channel that is currently selected by that mobile radio as its receive channel). A mobile radio that does not have a currently selected receive channel, and is instead scanning multiple auxiliary channels (and perhaps also the primary channel) is depicted with its receive-channel indicator containing the text "S" (for "scanning").

In the example scenario 300 that is depicted in FIG. 3, none of the mobile radios 202a-e have a selected transmit channel, and none of the mobile radios 202a-e have a selected receive channel. All five mobile radios 202a-e are using their respective receiver to scan the various channels in the channel set, as described above. All five transmit-channel indicators therefore read "N/A," and all five receive-channel indicators read "S." In at least one embodiment, at a point in time when there is no active channel, the mobile radios 202a-e each scan the channels in the channel set, looking for one of those channels (e.g., a predetermined primary channel, or perhaps any channel in the set) to transition from being inactive to being active. If no primary channel had been predetermined, a first channel in the channel set to transition from inactive to active could be then considered the primary channel for the talkgroup for at least some time, perhaps until a time at which all channels in the channel set are inactive. In another embodiment, the primary channel is predetermined for the talkgroup. In such an embodiment, at a point in time when there is no active channel, the respective receivers for each mobile radio could be configured to receive on the predetermined primary channel. If such an embodiment were depicted in FIG. 3, each receive-channel indicator in FIG. 3 would show a letter representing the primary channel instead of showing the scan indicator.

In connection with FIGS. 3-9, a given mobile radio being described as carrying out one or more of the steps of the process 100 is intended to indicate that the given mobile radio has carried out and/or is carrying out those one or more steps. In the ensuing description, the mobile radios 202a and 202b each independently carry out the process 100, while the mobile radio 202c carries out only some of the process 100. Moreover, the mobile radios 202d and 202e are not described as carrying out any of the process 100. One or both of the mobile radios 202d and 202e could be equipped, programmed, and/or configured to be able to carry out the process 100. In some embodiments, however, one or both of the mobile radios 202d and 202e are able to function only as receivers with respect to the talkgroup. And certainly other examples could be listed, including examples involving more or fewer than the five mobile radios 202a-e that are depicted by way of example in FIGS. 3-9.

Figure 4:
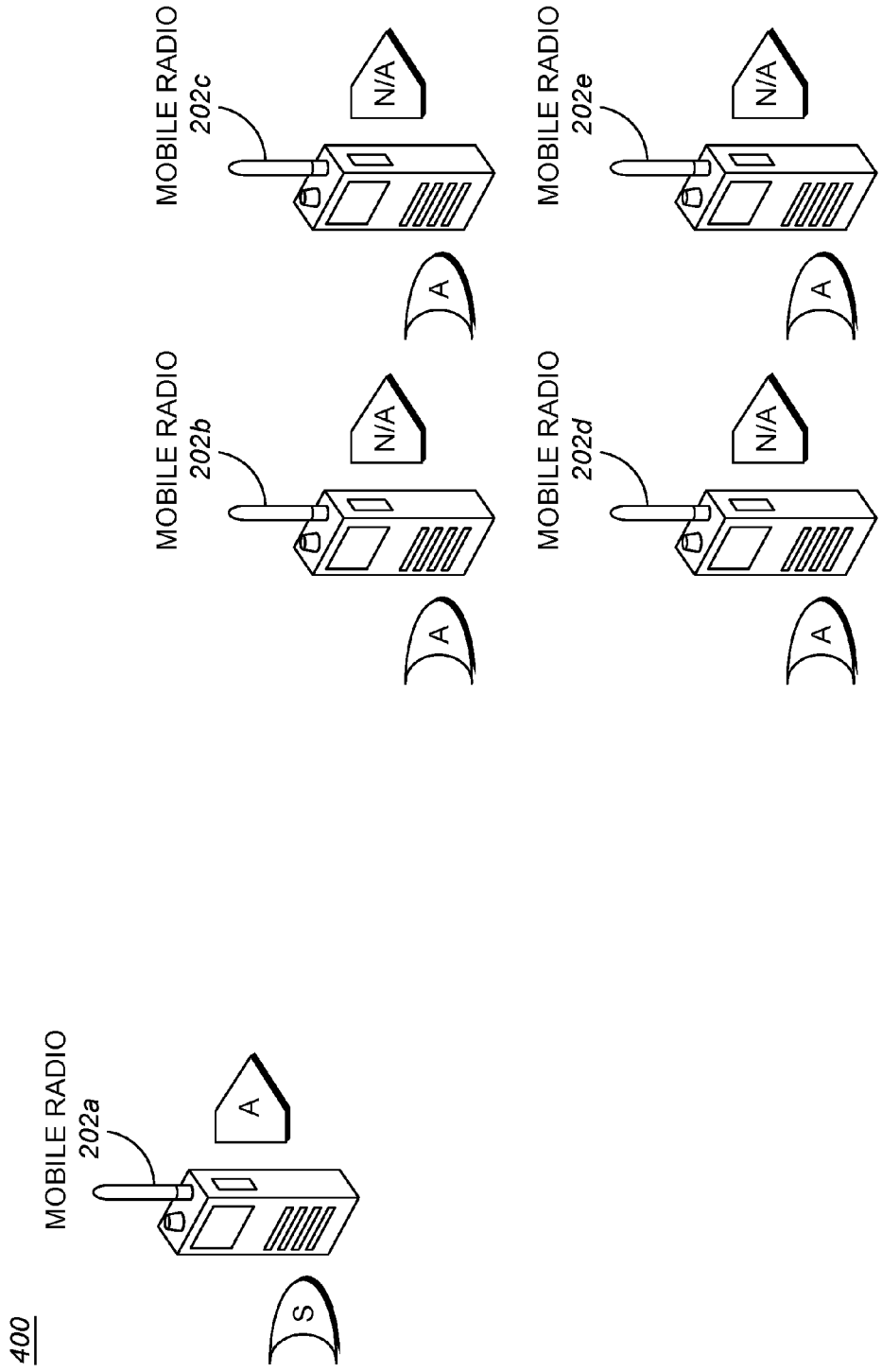
FIG. 4 depicts a second example scenario involving the mobile radios of FIG. 3, in accordance with an embodiment.

FIG. 4 depicts a second example scenario involving the mobile radios of FIG. 3, in accordance with an embodiment. In the example scenario 400 of FIG. 4, the mobile radio 202a receives via its user interface a broadcast-start command (step 102), selects the primary channel "A" as its transmit channel because at that point in time the primary channel A is inactive (step 104), receives user media via its user interface and transmits the received user media on its selected transmit channel A (step 106), and begins scanning for a transition of an auxiliary channel from inactive to active (step 108).

In at least one embodiment, the mobile radio 202a continues to scan for a transition of an auxiliary channel from inactive to active until it detects such a transition or until it receives a broadcast-end command, whichever comes first. In at least one embodiment, the mobile radios 202b-e scan until they detect that channel A has transitioned from inactive to active, and responsively set their respective receive channels to channel A. In at least one embodiment, the mobile radios 202b-e have their respective receivers set to receive on channel A because channel A is the predetermined primary channel for the talkgroup. In accordance with an embodiment, the primary channel, in this example channel A, is the default receive channel for each non-transmitting mobile radio 202b-e in the talkgroup.

Figure 5:
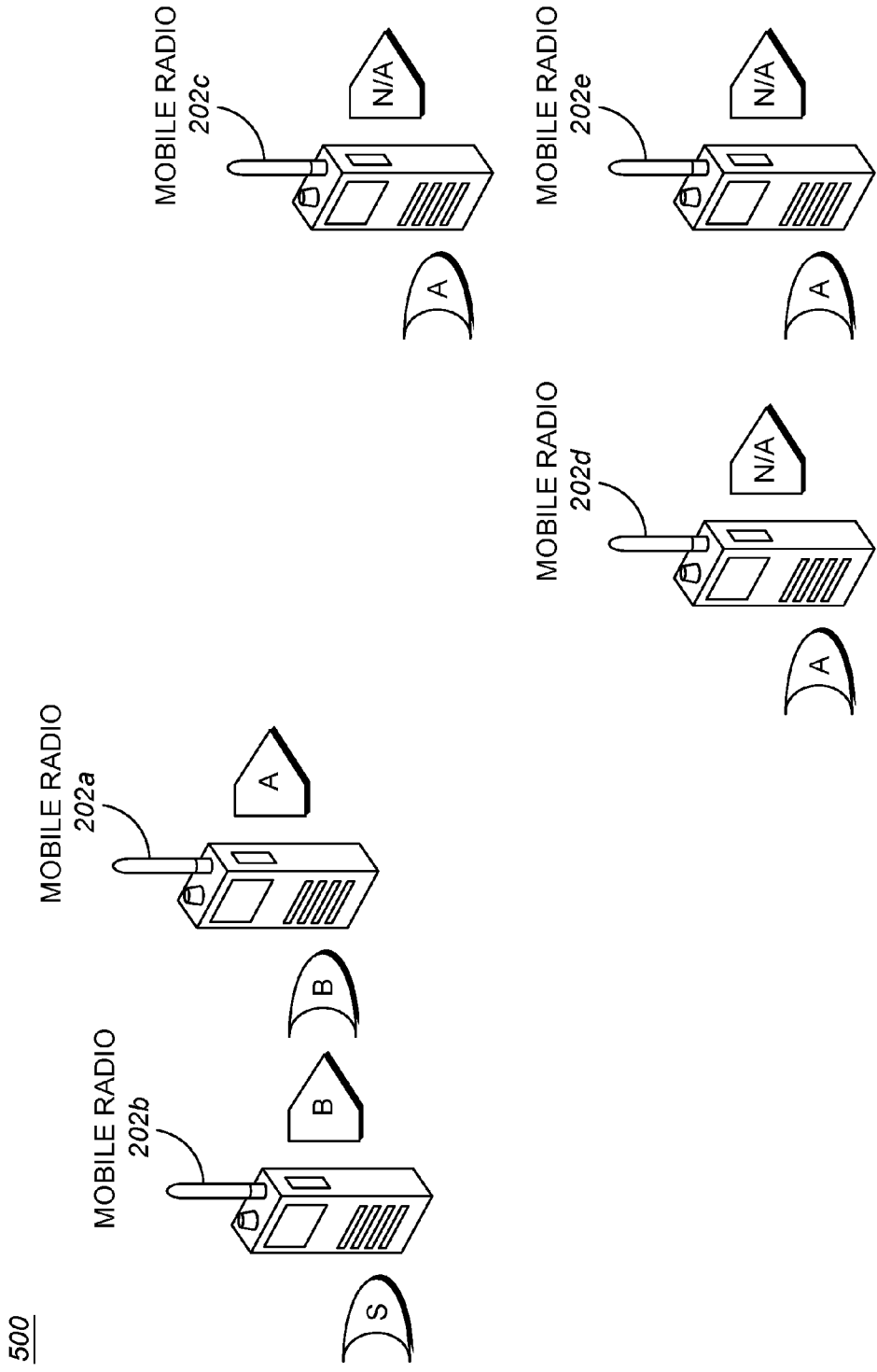
FIG. 5 depicts a third example scenario involving the mobile radios of FIG. 3, in accordance with an embodiment.

FIG. 5 depicts a third example scenario involving the mobile radios of FIG. 3, in accordance with an embodiment. In the example scenario 500 of FIG. 5, the mobile radio 202b receives via its user interface a broadcast-start command (step 102) and selects an auxiliary channel "B" as its transmit channel because at that point in time the primary channel A is active (step 104). In at least one embodiment, a predetermined sequence is defined among the primary channel and the respective auxiliary channels, perhaps stored as a list or mapping in a same location as the channel-set listing or in the channel-set listing itself. Assuming this paradigm, FIG. 5 depicts an example in which channel B is the next channel (and thus the first auxiliary channel) in the predetermined sequence. In another embodiment, the process for choosing an inactive auxiliary channel may involve a random or pseudorandom selection of an inactive auxiliary channel.

Moreover, in at least one embodiment, a given mobile radio (e.g., the mobile radio 202b) selecting an inactive auxiliary channel (e.g., channel B) as its transmit channel involves the mobile radio 202b selecting a test channel (e.g., channel B), verifying that the test channel B is inactive, transmitting a broadcast-request message on the test channel B, verifying that the test channel B is not currently carrying one or more other broadcast-request messages, and then selecting the test channel B as its transmit channel. A procedure such as that may be carried out in an attempt to avoid events such as multiple mobile radios selecting and transmitting over the same transmit channel, perhaps as a result of near-simultaneous broadcast-start commands.

The mobile radio 202a, responsive to detecting a transition from inactive to active on channel B, selects channel B as its receive channel for receiving inbound media (step 110). The mobile radio 202b receives user media via its user interface and transmits the received user media on its selected transmit channel B (step 106), and begins scanning for a transition of an auxiliary channel from inactive to active (step 108). The mobile radio 202a generates mixed media at least in part by mixing inbound media received on its selected receive channel B with user media received via its user interface (step 112) and transmits the resulting mixed media on its selected transmit channel A (step 114). In at least one embodiment, the mobile radio 202b continues to scan for a transition of an auxiliary channel from inactive to active until it either detects such a transition or receives a broadcast-end command.

Figure 6:
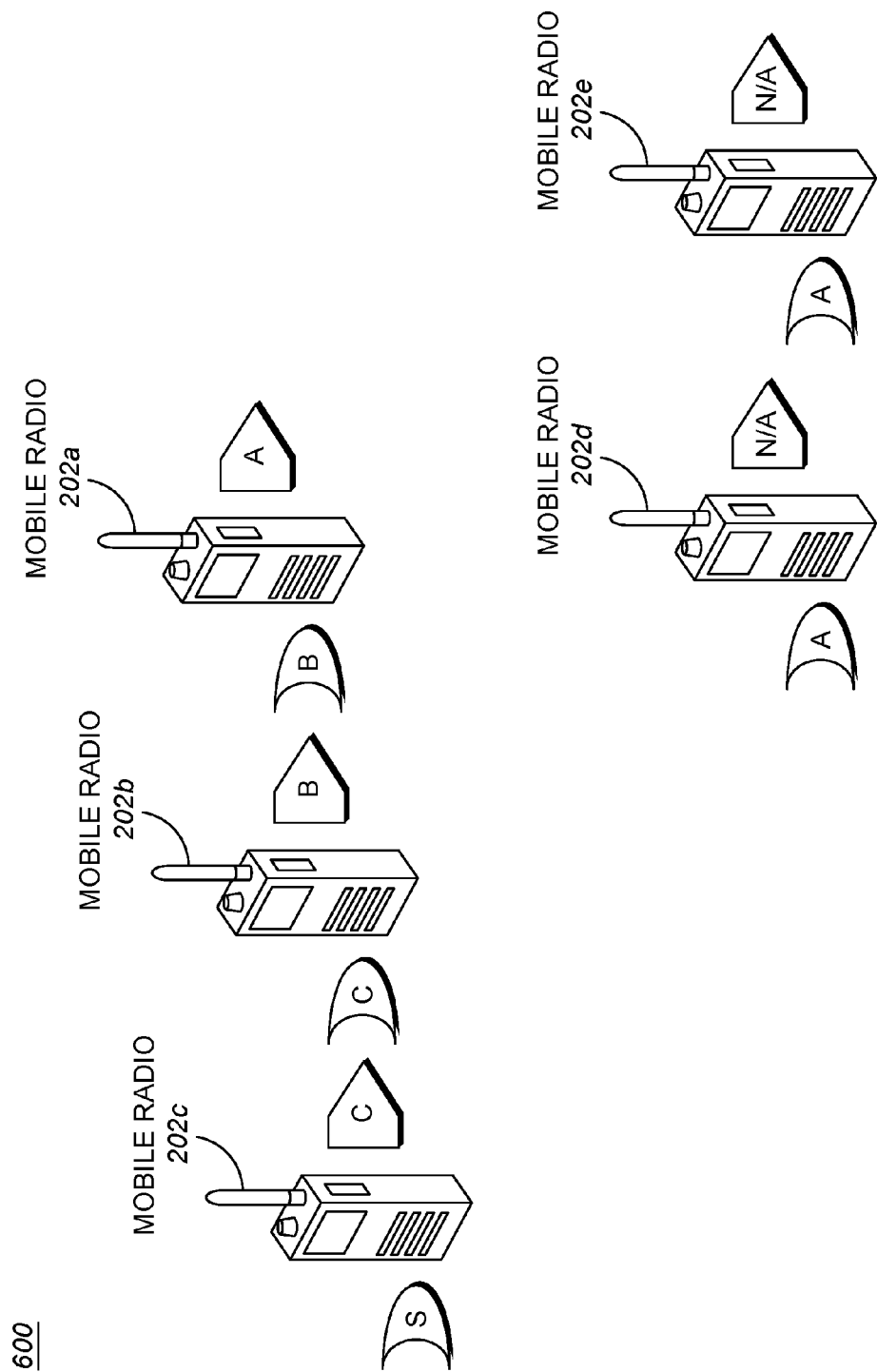
FIG. 6 depicts a fourth example scenario involving the mobile radios of FIG. 3, in accordance with an embodiment.

FIG. 6 depicts a fourth example scenario involving the mobile radios of FIG. 3, in accordance with an embodiment. In the example scenario 600 of FIG. 6, the mobile radio 202c receives via its user interface a broadcast-start command (step 102) and selects an auxiliary channel "C" as its transmit channel because at that point in time both the primary channel A and auxiliary channel B are active (step 104). The mobile radio 202b, responsive to detecting a transition from inactive to active on channel C, selects channel C as its receive channel for receiving inbound media (step 110). The mobile radio 202c receives user media via its user interface and transmits the received user media on its selected transmit channel C (step 106), and begins scanning for a transition of an auxiliary channel from inactive to active (step 108). In at least one embodiment, the mobile radio 202c continues to scan for a transition of an auxiliary channel from inactive to active until it either detects such a transition or receives a broadcast-end command. The mobile radio 202b generates mixed media at least in part by mixing inbound media received on its selected receive channel C with user media received via its user interface (step 112) and transmits the resulting mixed media on its selected transmit channel B (step 114).

The mobile radio 202a is still generating mixed media at least in part by mixing inbound media received on its selected receive channel B with user media received via its user interface (step 112) and transmitting the mixed media on its selected transmit channel A (step 114), though now the inbound media received on its selected receive channel B includes media mixed and then transmitted by mobile radio 202b. Thus, any mobile radio that is receiving on the primary channel A—such as the mobile radios 202d and 202e—is able to output to its respective user a media stream that includes user media being spoken into all three of the mobile radios 202a, 202b, and 202c that are currently forming a channel chain. At some point, a given mobile radio in a given channel chain might drop out of the chain, perhaps due to receiving a broadcast-stop command (e.g., the releasing of a PTT button) via its user interface. The descriptions below of FIGS. 7-9 discuss a few such examples.

Figure 7:
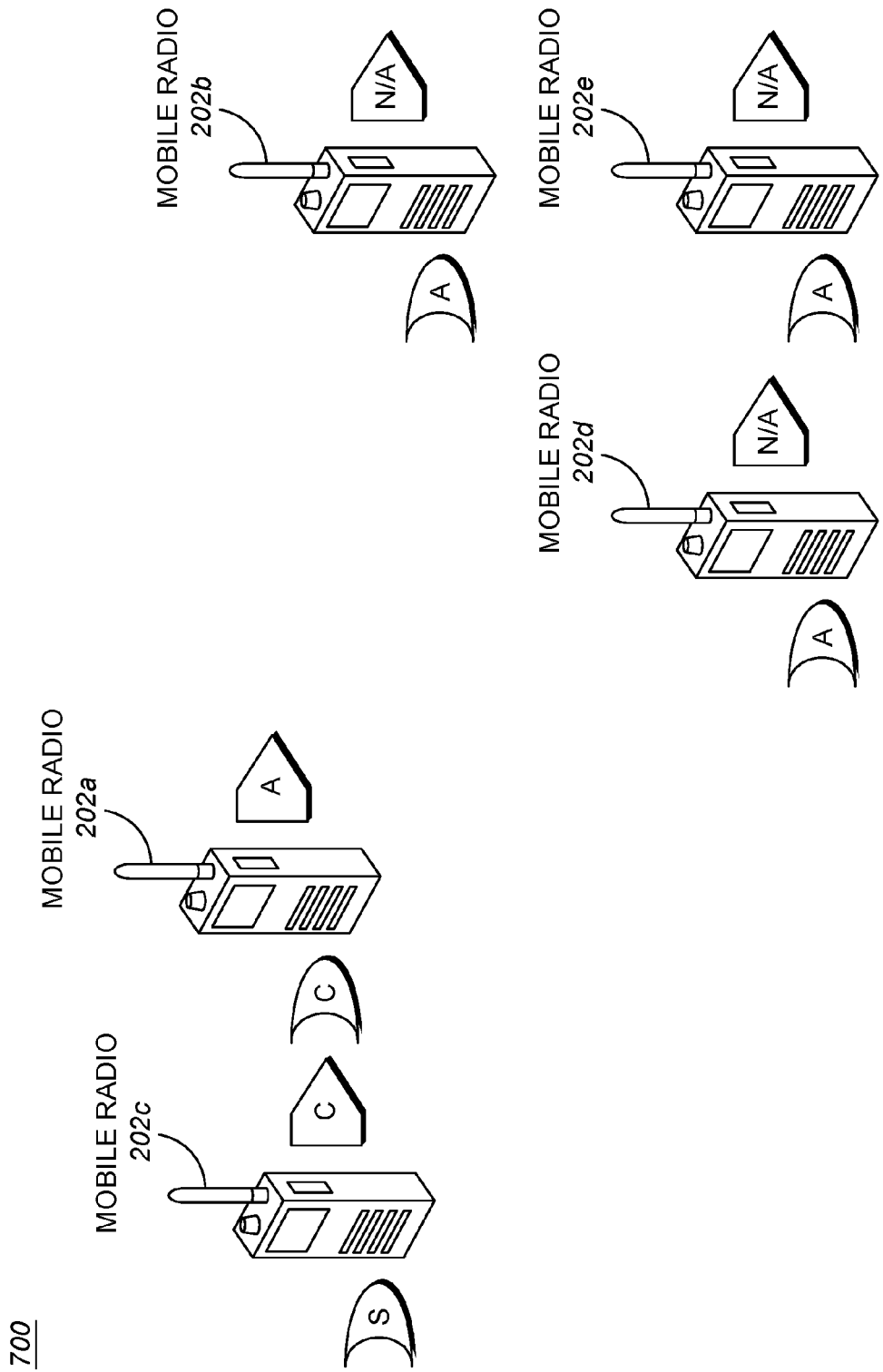
FIG. 7 depicts a fifth example scenario involving the mobile radios of FIG. 3, in accordance with an embodiment.

FIG. 7 depicts a fifth example scenario involving the mobile radios of FIG. 3, in accordance with an embodiment. The example scenario 700 that is depicted in FIG. 7 is one that could exist as a result of the example scenario 600 of FIG. 6 changing by the mobile radio 202b dropping out of the channel chain. As stated above, this could occur as a result of the mobile radio 202b receiving a broadcast-stop command via its user interface. Whatever the cause, the mobile radio 202b has transitioned to a state similar to that of the mobile radios 202d and 202e; to wit, the mobile radio 202*b* does not currently have a selected transmit channel, and it has selected the primary channel A as its receive channel. And it is noted that the various scenarios depicted in FIGS. 4-9 generally group transmitting mobile radios in the upper left and non-transmitting mobile radios in the lower left. This is for convenience of explanation and to enhance the reader's understanding, and in no way indicates spatial proximity or translational movement among the mobile radios in the talkgroup.

Returning to the example scenario 700 of FIG. 7, the mobile radio 202*b* is no longer transmitting on channel B or receiving on channel C. In the depicted example, the channel chain is patched by the mobile radio 202*a* changing its selected receive channel from channel B (on which the mobile radio 202*b* had been transmitting) to channel C (on which the mobile radio 202*b* had been receiving). The mobile radio 202*a* might do this in response to receiving a message from the mobile radio 202*b* that the mobile radio 202*b* has received a broadcast-stop command and will soon stop transmitting on channel B. The mobile radio 202*a* may simply know to change its receive channel from its current receive channel B to the next channel C in a predefined sequence. In an embodiment, the mobile radio 202*b* informs the mobile radio 202*a* via channel B that the mobile radio 202*b* has selected channel C as its receive channel, so that the mobile radio 202*a* will know how to patch the channel chain should the mobile radio 202*b* drop out. Such notice may come from the mobile radio 202*b* to the mobile radio 202*a* via channel B in a message indicating that the mobile radio 202*b* is about to stop transmitting, or perhaps in an earlier message, such that the mobile radio 202*a* will know how to patch the channel chain in the event that the mobile radio 202*b* unexpectedly stops transmitting on channel B. And certainly other possible implementations could be listed.

In at least one embodiment, the mobile radio 202*a* receives a termination notice (i.e., a notice that transmission will soon terminate) from the mobile radio 202*b*, where that termination notice identifies the mobile radio 202*b*'s terminating transmit channel B and terminating receive channel C. In at least one such embodiment, the mobile radio 202*a* responsively changes its receive channel from channel B to channel C responsive to making a determination that the mobile radio 202*a*'s current receive channel B matches the mobile radio 202*b*'s terminating transmit channel B. In an embodiment, the mobile radio 202*a* changes its receive channel from channel B to channel C in response to detecting that channel B is inactive (e.g., for a timeout period). And certainly numerous other examples of possible implementations could be listed.

Thus, in at least one embodiment, the mobile radio 202*a* identifies a contingency receive channel—in case, for example, the mobile radio 202*b* unexpectedly stops transmitting on channel B, perhaps due to an event such as its battery running out and/or some other event. In this example, the mobile radio 202*a* identifies channel C as its contingency receive channel. The mobile radio 202*a* may thereafter detect a termination event on its current receive channel B, and responsively change its selected receive channel from channel B to its identified contingency channel C. In at least one embodiment, the mobile radio 202*a* identifies its contingency receive channel C at least in part by receiving a termination notice on its selected receive channel B, where the termination notice identifies channel C; in at least one such embodiment, the termination event that the mobile radio 202*a* detects is the receipt of that termination notice. In at least one embodiment, the mobile radio 202*a* identifies its contingency receive channel C at least in part by receiving a message on its selected receive channel B, where the message identifies channel C. Still further, the termination event may be a non-receipt of communications on its selected receive channel B for a threshold period of time. Other possibilities exist as well.

Figure 8:
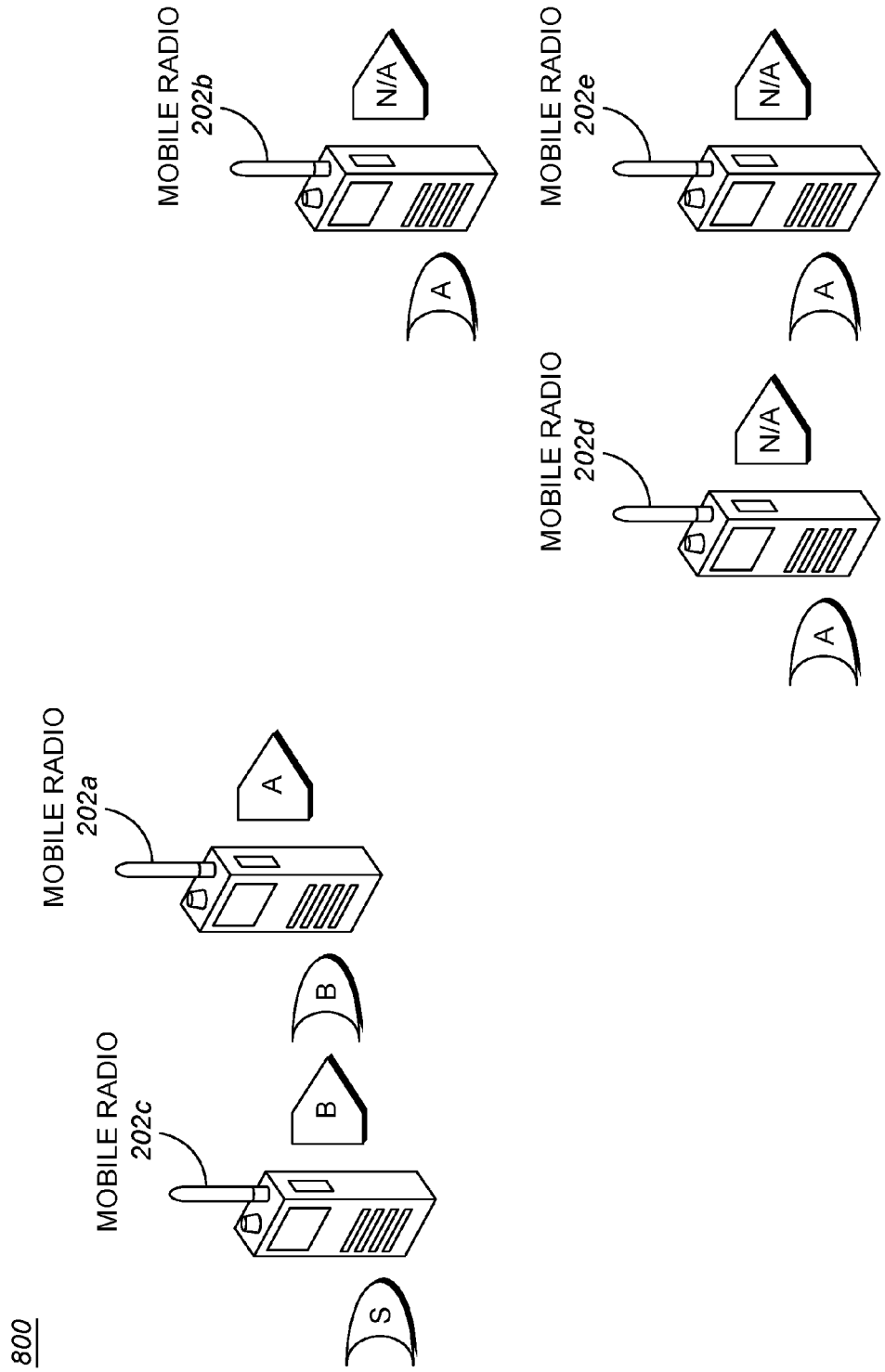
FIG. 8 depicts a sixth example scenario involving the mobile radios of FIG. 3, in accordance with an embodiment.

FIG. 8 depicts a sixth example scenario involving the mobile radios of FIG. 3, in accordance with an embodiment. Like the example scenario 700 that is depicted in FIG. 7, the example scenario 800 that is depicted in FIG. 8 is one that could exist as a result of the example scenario 600 of FIG. 6 changing by the mobile radio 202*b* dropping out of the channel chain. Due to its similarity to FIG. 7, FIG. 8 is not described in as great of detail. In FIG. 8, however, the channel chain is patched by the mobile radio 202*c* changing its selected transmit channel from channel C (on which mobile radio 202*b* had been receiving) to channel B (on which mobile radio 202*b* had been transmitting). The mobile radio 202*c* might do this in response to receiving a message from the mobile radio 202*b* that the mobile radio 202*b* has received a broadcast-stop command and will soon stop receiving on channel C. Such a message could be relayed around the chain, perhaps in an embodiment in which the scanning function—that is carried out by the mobile radio 202*c* in this particular moment of this particular example— includes monitoring the primary channel A for messages such as that one.

Responsive to being informed that the mobile radio 202*b* is about to stop receiving on channel C, the mobile radio 202*c* may simply know to change its transmit channel from its current transmit channel C to the previous channel B in a predefined sequence. In an embodiment, the mobile radio 202*b* informs the mobile radio 202*c* (again, perhaps via a message that is relayed around the chain) that the mobile radio 202*b* has selected channel B as its transmit channel, so that the mobile radio 202*c* will know how to patch the channel chain should the mobile radio 202*b* drop out. Such notice may come from the mobile radio 202*b* to the mobile radio 202*c* in a message indicating that the mobile radio 202*b* is about to stop transmitting, or perhaps in an earlier message, such that the mobile radio 202*c* will know how to patch the channel chain in the event that the mobile radio 202*b* unexpectedly stops transmitting on channel B and receiving on channel C. In some embodiments, if the mobile radio 202*a* detects that the mobile radio 202*b* has stopped transmitting on channel B (e.g., for at least a time period), then the mobile radio 202*a* responsively notifies the mobile radio 202*c* of this event using a messaging mechanism such as that described above. And certainly other possibilities could be listed.

In at least one embodiment, the mobile radio 202*c* receives a termination notice (i.e., a notice that transmission will soon terminate) from the mobile radio 202*b*, where that termination notice identifies the mobile radio 202*b*'s terminating transmit channel B and terminating receive channel C. In at least one such embodiment, the mobile radio 202*c* responsively changes its transmit channel from channel C to channel B responsive to making a determination that the mobile radio 202*c*'s current transmit channel C matches the mobile radio 202*b*'s terminating receive channel C. And certainly other examples of possible implementations could be listed.

Figure 9:
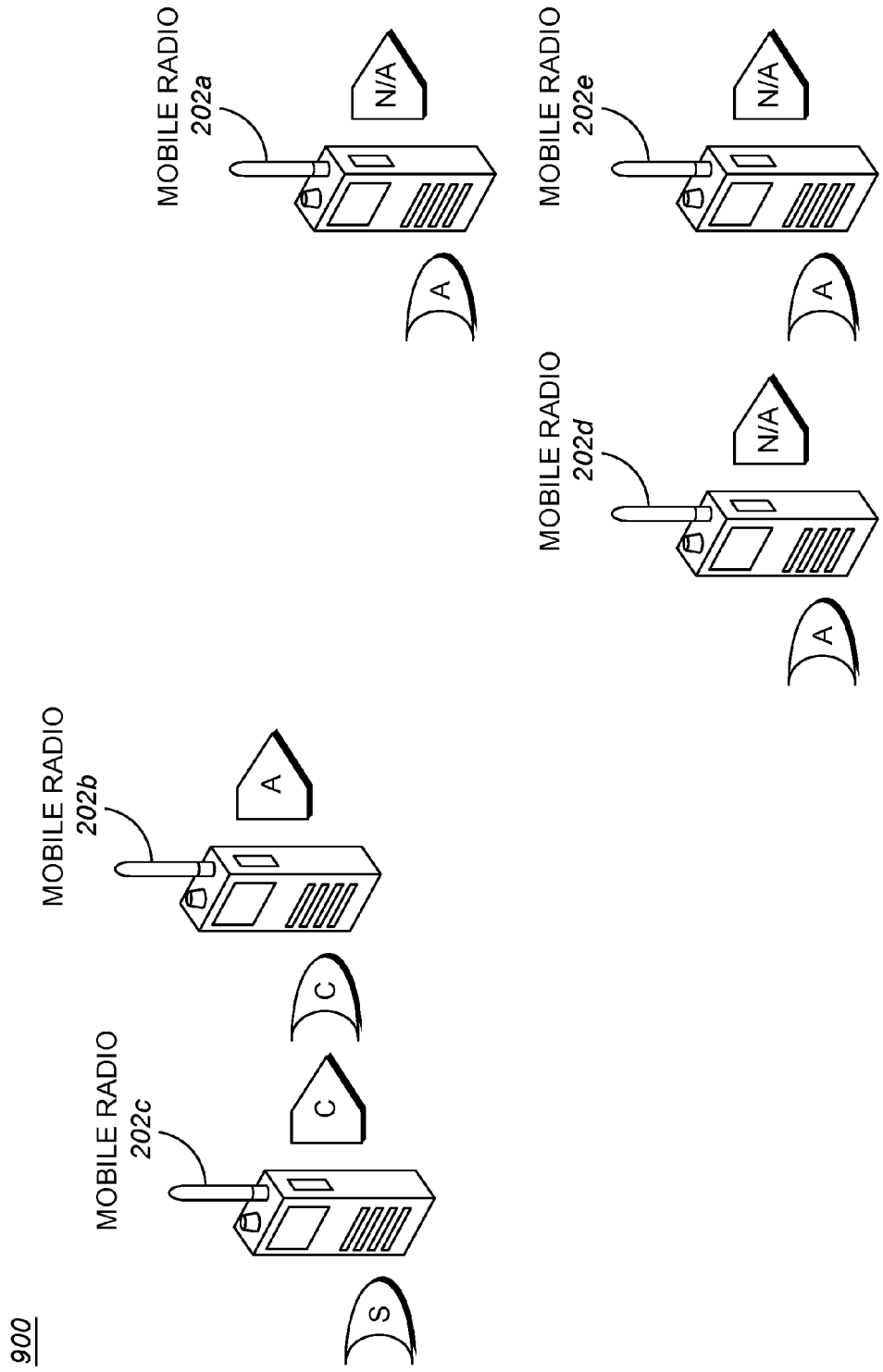
FIG. 9 depicts a seventh example scenario involving the mobile radios of FIG. 3, in accordance with an embodiment.

FIG. 9 depicts a seventh example scenario involving the mobile radios of FIG. 3, in accordance with an embodiment. FIG. 9 depicts an example talkgroup which could exist immediately after the scenario depicted in FIG. 6. In FIG. 9, the mobile radio 202*a* stops transmitting media over its transmit channel A. In this example, the mobile radio 202c detects a termination event on channel A while scanning the channel set. The mobile radio 202c then transmits a termination notice via its transmit channel C to the mobile radio 202b. The mobile radio 202b then changes its transmit channel to channel A, resulting in those subscriber units that are receiving on channel A being able to hear user media from the mobile radio 202b mixed with user media from the mobile radio 202c. The mobile radio 202b could select channel A as its new transmit channel based on information in a received termination notice, based on a known predefined channel sequence, based on channel A being the primary channel and being inactive, and/or based on one or more other considerations and/or events described herein or known to those of skill in the relevant art having the benefit of this description.

Figure 10:
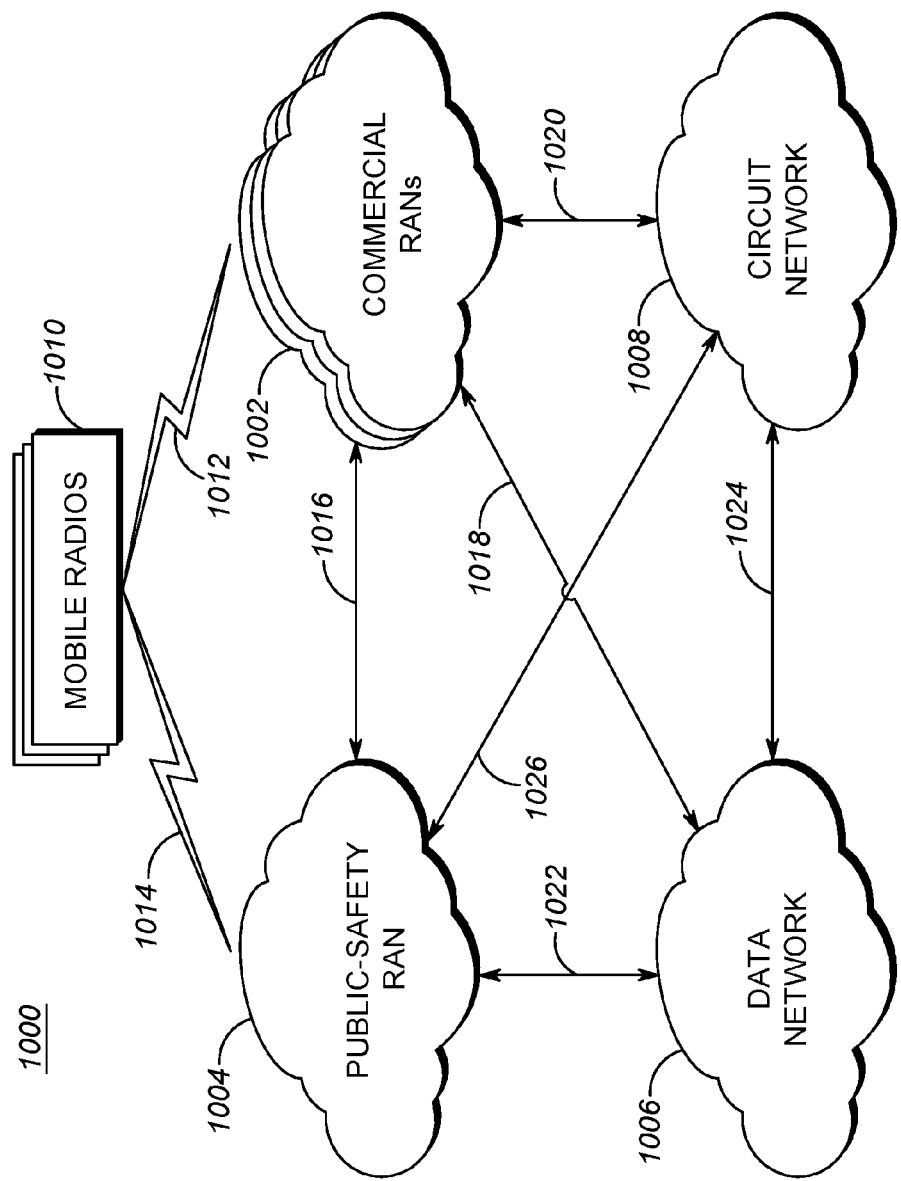
FIG. 10 depicts an example communication system, in accordance with an embodiment.
Figure 11:
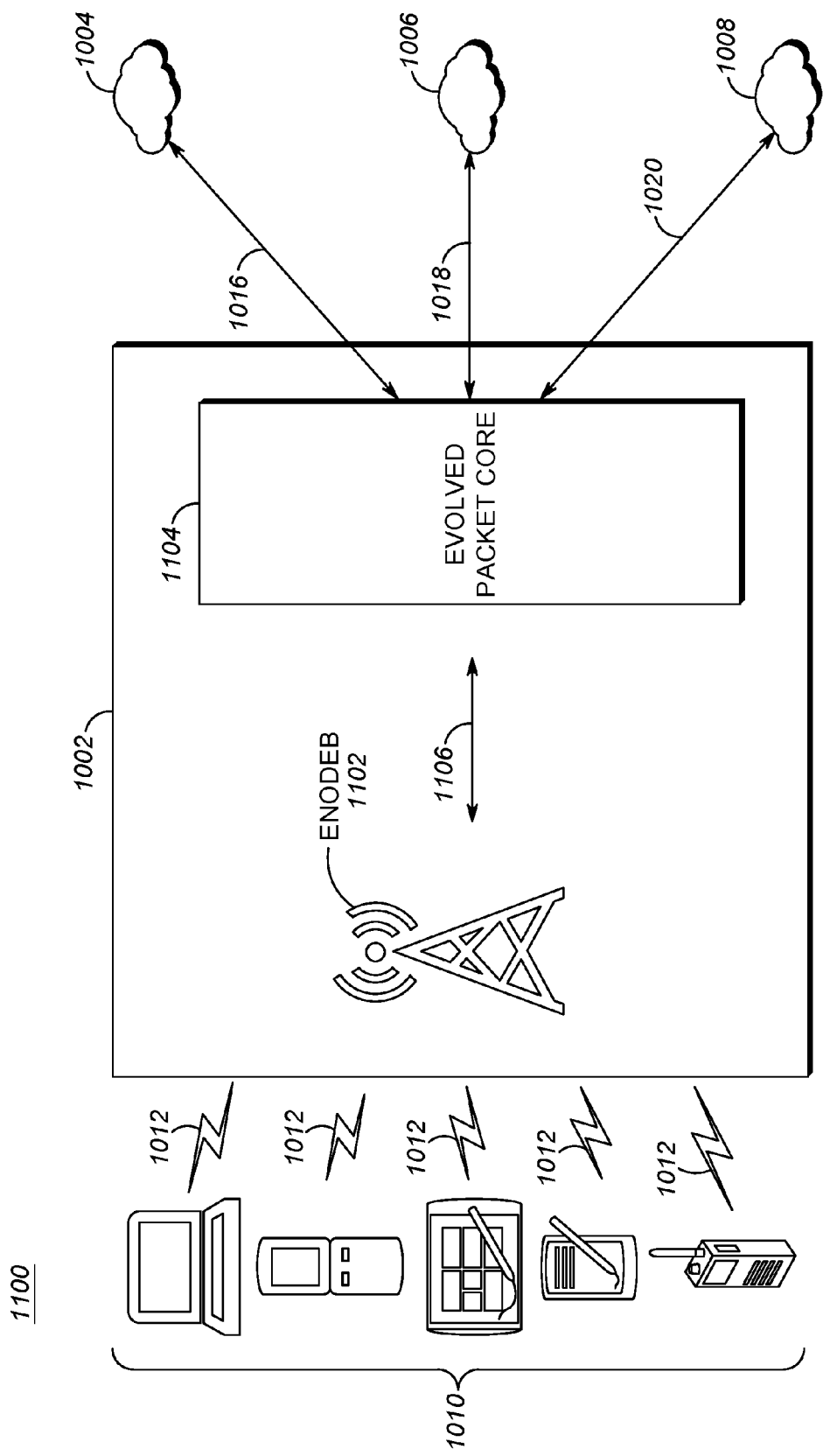
FIG. 11 depicts a further example of the communication system of FIG. 10, in accordance with an embodiment.

The next portion of this disclosure includes descriptions of FIGS. 10-11, which in general depict a communication system in which mobile radios communicate via one or more radio access networks (RANs). It is explicitly noted that mobile radios that communicate via one or more RANs may also be capable of communicating directly with one another in the manner described above. Thus, while mobile radios that are capable of engaging in communication directly with one another but not via one or more RANs could certainly carry out and embody the present methods and systems, mobile radios that are capable of both direct-mode and RAN-based communication could certainly carry out and embody the present methods and systems as well.

FIG. 10 depicts an example communication system, in accordance with an embodiment. In particular, FIG. 10 depicts an example communication system 1000 that includes one or more commercial RANs 1002, a public-safety RAN 1004, a data network 1006, a circuit network 1008, mobile radios 1010, and communication links 1012-1026.

An example commercial RAN 1002 is discussed below in connection with FIG. 11, though in general, each RAN 1002 and the RAN 1004 includes typical RAN elements such as base stations, base station controllers, routers, switches, and the like, arranged, connected, and programmed to provide wireless service to user equipment (e.g., the mobile radios 1010) in a manner known to those of skill in the relevant art.

The public-safety RAN 1004 may include one or more packet-switched networks and/or one or more circuit-switched networks, and in general functions to provide one or more public-safety agencies with any necessary computing and communication needs. Thus, the public-safety RAN 1004 may include a dispatch center communicatively connected with the data network 1006 and also with the circuit network 1008, for retrieving and transmitting any necessary public-safety-related data and communications. The public-safety RAN 1004 may also include any necessary computing, data-storage, and data-presentation resources utilized by public-safety personnel in carrying out their public-safety functions. Moreover, the public-safety RAN 1004 may include one or more network access servers (NASs), gateways, and the like for bridging communications to one or more other entities and/or networks, such as the commercial RANs 1002, the data network 1006, and the circuit network 1008, as representative examples.

The data network 1006 may be, include, or be a part of the global network of networks typically referred to as the Internet. The data network 1006 may be a packet-switched network, and entities (i.e., servers, routers, computers, and the like) that communicate over the data network 1006 may be identified by a network address such as an Internet Protocol (IP) address. Moreover, the data network 1006 may include one or more NASs, gateways, and the like for bridging communications to one or more other entities and/or networks, such as the commercial RANs 1002, the public-safety RAN 1004, and the circuit network 1008, as representative examples.

The circuit network 1008 may be, include, or be a part of the circuit-switched telephone network commonly referred to as the public switched telephone network (PSTN), and in general functions to provide circuit-switched communications to various communication entities as is known in the art. Moreover, the circuit network 1008 may include one or more NASs, gateways, and the like for bridging communications to one or more other entities and/or networks, such as the commercial RANs 1002, the public-safety RAN 1004, and the data network 1006, as representative examples.

The depicted example communication system 1000 includes communication links 1012-1026, any one or more of which could include one or more wireless-communication links and/or one or more wired-communication links. In FIG. 10, the communication links 1012 and 1014 are depicted with respective lightning-bolt graphics; while this graphic typically denotes wireless communication, and does in this example as well, this is not to the exclusion of one or more of the other communication links 1014-1026 being or at least including wireless-communication links as well.

As can be seen in FIG. 10, the communication link 1012 (as mentioned above) connects the commercial RANs 1002 and the mobile radios 1010, the communication link 1014 (as mentioned above) connects the public-safety RAN 1004 and the mobile radios 1010, the communication link 1016 connects the commercial RANs 1002 and the public-safety RAN 1004, the communication link 1018 connects the commercial RANs 1002 and the data network 1006, the communication link 1020 connects the commercial RANs 1002 and the circuit network 1008, the communication link 1022 connects the public-safety RAN 1004 and the data network 1006, the communication link 1024 connects the data network 1006 and the circuit network 1008, and the communication link 1026 connects the public-safety RAN 1004 and the circuit network 1008. This arrangement is provided purely by way of example, as other arrangements could be implemented by those of skill in the relevant art in various different contexts.

The mobile radios 1010 may be any suitable computing and communication devices configured to engage in wireless communication with one or both of (i) the commercial RANs 1002 over the air interface 1012 as is known to those in the relevant art and (ii) the public-safety RAN 1004 over the air interface 1014 as is known to those in the relevant art. Some example mobile radios 1010 and communication links 1012 are discussed below in connection with the various figures.

FIG. 11 depicts a further example of the communication system of FIG. 10, in accordance with an embodiment. FIG. 11 depicts the communication system 1000 of FIG. 10, though in more detail regarding some example mobile radios 1010 and an example commercial RAN 1002, although a similar figure could be depicted with the sole change being the use of an example public-safety RAN 1004 instead of the example commercial RAN 1002. In particular, FIG. 11 depicts the RAN 1002 as including an eNodeB 1102, which communicates directly or indirectly with an evolved packet core (EPC) 1104 over a communication link 1106. As is the case with each of the links mentioned above, and as is the case with any of the links mentioned anywhere else in this disclosure, the link 1106 may be or include one or more wireless-communication links and/or one or more wired-communication links, as deemed suitable by those of skill in the relevant art in a given context.

In at least one embodiment, the eNodeB 1102 includes the hardware and software (and/or firmware) necessary for the eNodeB 1102 to function as an eNodeB, a NodeB, a base station, a base transceiver station (BTS), a WiFi access point, and/or the like, as known to those having skill in the relevant art. In some instances, the eNodeB 1102 in the example RAN 1002 may also include functionality typically associated in the art with entities that are often referred to by terms such as base station controllers (BSCs), radio network controllers (RNCs), and the like. Also, while one eNodeB 1102 is depicted by way of example in FIG. 11, any suitable number of eNodeBs could be deployed as deemed suitable by those of skill in the relevant art.

In general, the eNodeB 1102 is an entity that, on one side (i.e., the wireless-network side (interface)), engages in wireless communication over the air interface 1012 with one or more mobile radios 1010 according to a protocol such as LTE or the like and, on the other side (i.e., the "backhaul" side), engages in communications with the EPC 1104 via the communication link 1106, to facilitate communications between various mobile radios 1010 and networks such as the networks 1004, 1006, and 1008.

The EPC 1104 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the mobile radios 1010 via the eNodeB 1102, and to bridge such wireless service with various transport networks. In general, a commercial RAN and a public-safety RAN may each provide wireless service according to a protocol such as LTE, WiFi, and/or the like. These examples are provided for illustration and not by way of limitation; moreover, those of skill in the relevant art are aware of variations among different protocols and among different implementations of a given protocol, and of similarities across different protocols.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
a mobile radio receiving via a user interface a broadcast-start command associated with a talkgroup in which the mobile radio is a participant, the talkgroup having an associated channel set that includes a primary channel and a group of auxiliary channels, the mobile radio having a selectable transmit channel and a selectable receive channel;
the mobile radio, responsive to receiving the broadcast-start command, selecting the primary channel as its transmit channel if the primary channel is inactive, and otherwise selecting an inactive auxiliary channel as its transmit channel;
the mobile radio receiving user media via the user interface, and transmitting received user media on the selected transmit channel;
the mobile radio scanning for a transition of an auxiliary channel from inactive to active; and
the mobile radio, responsive to detecting such a transition on a given auxiliary channel, selecting the given auxiliary channel as its receive channel for receiving inbound media, generating mixed media at least in part by mixing inbound media received on the selected receive channel with user media received via the user interface, and transmitting the mixed media on the selected transmit channel.

2. The method of claim 1, wherein the broadcast-start command corresponds to a push-to-talk (PTT) button being held down.

3. The method of claim 1, wherein the talkgroup is a push-to-talk (PTT) talkgroup.

4. The method of claim 1, wherein the primary channel is a predetermined one of the channels in the channel set.

5. The method of claim 1, further comprising the mobile radio determining that no channels in the channel set are currently active, and responsively designating a given channel from the channel set as being the primary channel.

6. The method of claim 1, wherein the primary channel is the default receive channel for each non-transmitting mobile radio in the talkgroup.

7. The method of claim 1, wherein the mobile radio selecting an inactive auxiliary channel as its transmit channel comprises:
the mobile radio selecting a test channel;
the mobile radio verifying that the test channel is inactive;
the mobile radio transmitting a broadcast-request message on the test channel;
the mobile radio verifying that the test channel is not currently carrying one or more other broadcast-request messages; and
the mobile radio selecting the test channel as its transmit channel.

8. The method of claim 1, wherein a predetermined sequence is defined among the primary channel and the respective auxiliary channels.

9. The method of claim 8, further comprising the mobile radio determining that its current receive channel is inactive, and responsively changing its selected receive channel to be the next active channel in the predetermined sequence.

10. The method of claim 1, further comprising:
the mobile radio identifying a contingency receive channel; and
the mobile radio detecting a termination event on its current receive channel, and responsively changing its selected receive channel to be the contingency receive channel.

11. The method of claim 10, wherein:
identifying the contingency receive channel comprises receiving a termination notice on the selected receive channel, the termination notice identifying the contingency receive channel; and
detecting the termination event comprises receiving the termination notice.

12. The method of claim 10, wherein identifying the contingency receive channel comprises, prior to detecting the termination event, receiving a message on the selected receive channel, the message identifying the contingency receive channel.

13. The method of claim 12, wherein detecting the termination event comprises receiving a termination notice on the selected receive channel.

14. The method of claim 12, wherein detecting the termination event comprises detecting that the selected receive channel is inactive.

15. The method of claim 1, further comprising the mobile radio transmitting outbound metadata on the selected transmit channel, the outbound metadata identifying the selected receive channel.

16. The method of claim 1, further comprising the mobile radio receiving a termination notice identifying a terminating transmit channel and a terminating receive channel, and responsively:
changing its selected transmit channel to be the identified terminating transmit channel when its current transmit channel matches the identified terminating receive channel; and
changing its selected receive channel to be the identified terminating receive channel when its current receive channel matches the identified terminating transmit channel.

17. The method of claim 1, further comprising the mobile radio receiving via the user interface a broadcast-stop command, and responsively carrying out a set of broadcast-stop functions, the set of broadcast-stop functions including:
terminating transmitting on the selected transmit channel; and
selecting the primary channel as its receive channel.

18. The method of claim 17, wherein the broadcast-stop command corresponds to a push-to-talk (PTT) button being released.

19. The method of claim 17, wherein the set of broadcast-stop functions further includes transmitting a termination notice on the selected transmit channel.

20. A mobile radio comprising:
a user interface;
a communication interface having a selectable transmit channel and a selectable receive channel;
a processor; and
data storage containing instructions executable by the processor for causing the mobile radio to carry out a set of functions, the set of functions including:
receiving via the user interface a broadcast-start command associated with a talkgroup in which the mobile radio is a participant, the talkgroup having an associated channel set that includes a primary channel and a group of auxiliary channels;

responsive to receiving the broadcast-start command, selecting the primary channel as its transmit channel if the primary channel is inactive, and otherwise selecting an inactive auxiliary channel as its transmit channel;

receiving user media via the user interface, and transmitting received user media on the selected transmit channel via the communication interface;

scanning, via the communication interface, for a transition of an auxiliary channel from inactive to active; and responsive to detecting, via the communication interface, such a transition on a given auxiliary channel, selecting the given auxiliary channel as its receive channel for receiving inbound media, generating mixed media at least in part by mixing inbound media received on the selected receive channel with user media received via the user interface, and transmitting, via the communication interface, the mixed media on the selected transmit channel.

* * * * *